United States Patent [19]

James

[11] 4,451,868
[45] May 29, 1984

[54] ELECTRICAL CAPACITOR

[75] Inventor: Stephen A. James, Hennepin County, Minn.

[73] Assignee: Honeywell Inc., Minneapolis, Minn.

[21] Appl. No.: 398,484

[22] Filed: Jul. 15, 1982

[51] Int. Cl.$^3$ .............................................. H01G 1/14
[52] U.S. Cl. .................................................... 361/306
[58] Field of Search ............... 29/25.42; 361/306–308, 361/323, 324

[56] References Cited

U.S. PATENT DOCUMENTS

| 1,990,819 | 10/1933 | Danziger | 29/25.42 X |
|---|---|---|---|
| 2,047,273 | 11/1933 | Kopinski | 29/25.42 X |
| 2,956,220 | 10/1960 | Kohring | 29/25.42 X |
| 3,100,330 | 1/1959 | Rice et al. | 29/155.55 |
| 3,391,313 | 7/1968 | Hevey | 29/25.42 X |
| 3,662,236 | 5/1972 | Markarian et al. | 25/25.42 X |

FOREIGN PATENT DOCUMENTS 832173  2/1952  Fed. Rep. of Germany ...... 361/308

Primary Examiner—Donald A. Griffin
Attorney, Agent, or Firm—George W. Field

[57] ABSTRACT

In a wound capacitor, in combination: a capacitance roll including electrodes spaced by dielectric layers, the electrodes projecting separately to opposite ends of the roll; a pair of discs at the ends of the roll and shaped to conform with the ends of the roll, each disc having a first, roughened surface for intimately engaging the electrode at the end of the roll, and having a conductor extending generally axially away from a second surface thereof, each conductor having an offset spaced from the disc; a housing for the capacitor comprising a tube with end closures; and structure maintaining the discs in contact with the ends of the roll, including an insulating spacer between each disc and the adjacent end closure of the tube.

2 Claims, 3 Drawing Figures

ELECTRICAL CAPACITOR

TECHNICAL FIELD

This invention relates to the field of electrical engineering, and particularly to the design of wound electrical capacitors.

BACKGROUND OF THE INVENTION

It is well known to construct electrical capacitors by winding on a mandrel a roll comprising layers of dielectric materials separating layers of electrical conductors which comprise the electrodes of the capacitor. The winding is formed so that one electrode projects to the edge of the roll at only one end, while the other electrode projects to the edge of the roll at only the other end. After the roll is secured by a wrap of tape, it is removed from the mandrel: connections must now be made to the electrodes.

Heretofore there has been no completely satisfactory way of making connections to the electrodes which will give continuous, reliable service through temperature cycles and regardless of the mechanical vibration such components must undergo in use.

BRIEF SUMMARY OF THE INVENTION

The present invention comprises an arrangement by which relieable connections are made to the electrodes of the capacitor by the use of discs carrying conductors or leads and having spiked or roughened surfaces for engaging the electrodes, the assembly being completed by spacers engaging the ends of a hermetically sealed casing and closing the capacitor.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
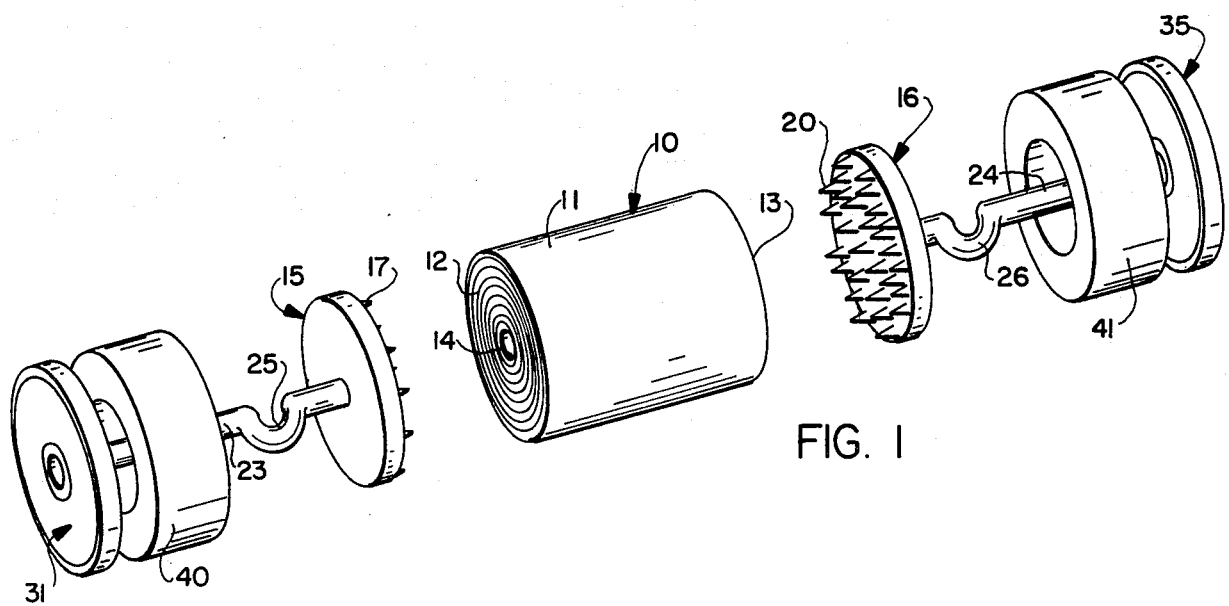
FIG. 1 is an exploded view of a capacitor according to the invention during assembly.

Turning now to FIG. 1, a capacitor roll or "section" 10 comprises first and second thin helical electrodes spaced by dielectric layers and secured by an outer wrapping of tape 11. As is customary, one of the electrodes projects to only a first end 12 of the roll, and the other electrode projects to only the opposite end 13 of the roll. The axial hole through the roll, from which the winding mandrel has been removed, is shown at 14.

Electrical connections must be made to the two electrodes of the capacitor. This is done by a pair of discs 15 and 16 having roughened or spiked surfaces 17 and 20 shaped to conform with one ends of roll 10. Leads 23 and 24 are welded or otherwise secured to second surfaces of discs 15 and 16, and include strain relief offsets 25 and 26 near the discs.

Figure 2:
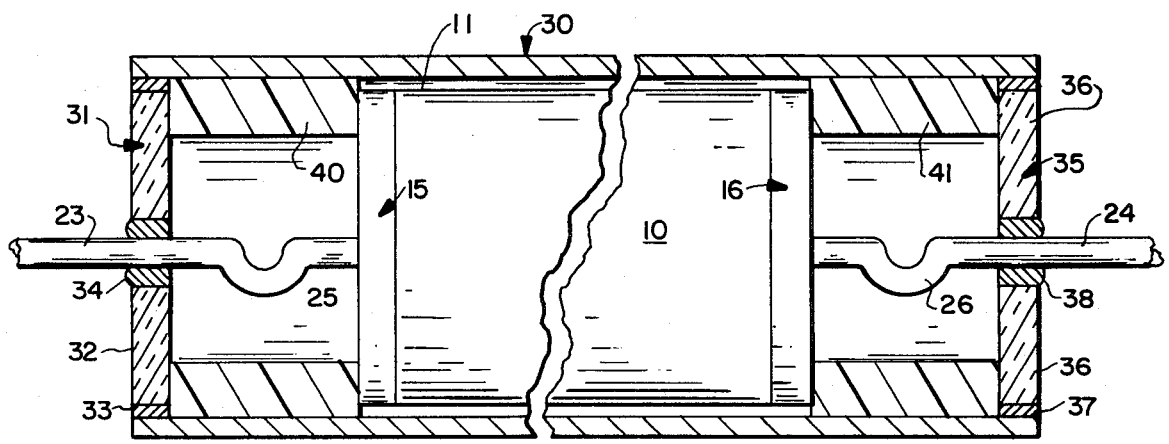
FIG. 2 is a view generally and longitudinal section of a capacitor after assembly.

The invention is well adapted for capacitances assembled in hermetically sealed containers, as is shown in FIG. 2. Here a tube 30 is closed at one end by a seal 31 including a glass disc 32 having an outer metal rim 33 soldered to tube 30, and a central metalic eyelet 34. A similar seal 35 is provided for assembly to the other end of tube 30, and has a glass disc 36, a ring 37, and an eyelet 38.

To assemble the capacitor, a spacer 40 of insulating material is inserted in a tube 20 to bear on seal 31 and then elements 10, 15 and 16 as a unit are inserted into the tube so that conductor 23 passes out through eyelet 34, and disc 15 rests against spacer 40. A second spacer 41 is introduced into the tube to rest against disc 16, passing over conductor 24. Seal 35 is now positioned with conductor 24 passing through eyelet 38, and ring 36 is soldered to tube 30. Finally, conductors 23 and 24 are soldered to eyelets 34 and 38.

Spacers 40 and 41 are of sufficient inside diameter to provide space for offsets for 25 and 26. The spacers preferably made of type 610 nylon, 40% filled with glass, as this material has thermal coefficient of expansion which matches the tube and conductors. For non-hermetic capacitors, the spacers 40 are made to be the same diameter as the wound capacitor section 10. The assembly of the section 10 with a spacer 40 on each end is then placed in a jig and taped together with a tape that is wider than the assembly. It is then removed from the jig and each end filled with epoxy to hold the assembly together.

The invention described above is particularly well adapted for use with capacitors of comparatively small diameter, a quarter of an inch and smaller, for example.

Figure 3:
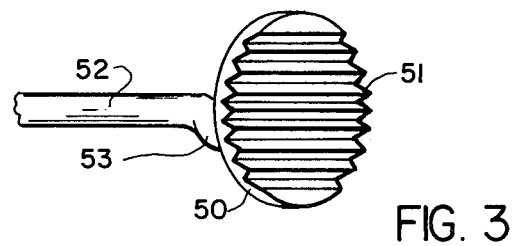
FIG. 3 is a perspective view of a modification.

FIG. 3 is a view in perspective of a modification of the invention in which a disc 50 has a roughened surface in a form of a field of sharp ridges 51 of saw-tooth configuration, extending parallel to a diameter of the disc, a conductor 52 and an offset 53 being provided as before. Disc 50, and also discs 15 and 16 of FIG. 1, are conveniently made by casting, from a metalic substance such as copper, and are then tinned for improved electrical contact with the metal of the electrodes being engaged by the roughened surfaces.

Assembly of capacitors using the structure of FIG. 3 is facilitated if the discs are heated and pressed against the end of the capacitor section in a simple jig. The heat makes the pentration of the ridges into contact with the electrode more certain, and also melts the dielectric, usually a plastic, to cause adhesion between the parts so that insertion in a tube 30 is simplified. Heat may also be used with the spiked configuration of discs 15 and 16 if this is desired.

From the above it will be evident that I have invented a capacitor structure in which connection is made to the electrodes in a simple, mechanically reliable manner which cooperates with the casing of the capacitor, maintaining the leads firmly secured and permanently in an electrical connection with the electrodes.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape size, and arrangement of parts, within the principle of the invention, to the full extent indicated by the broad general meaning of the terms in which the appended claims are expressed.

The embodiments of the invention in which an exclusive property or right is claimed are defined as follows:

1. In a wound capacitor, in combination:
    a capacitance roll including electrodes spaced by dielectric layers, the electrodes projecting separately to opposite ends of the roll;
    a pair of discs at the ends of said roll and shaped to conform with the ends of said roll, each said disc having a first, roughened surface for intimately engaging the electrode at the end of said roll, and having a conductor extending generally axially away from a second surface thereof, each conductor having a strain relief offset spaced from said disc;
    a housing for said capacitor comprising a tube with end closures and out of contact with said offset;
    and means maintaining said discs in contact with the ends of said roll, including a tubular insulating spacer between each disc and the adjacent end closure of the tube and out of contact with said offset.

2. In a wound capacitor, in combination:
    a capacitance roll including electrodes spaced by dielectric layers, the electrodes projecting separately to opposite ends of the roll;
    a pair of discs at the ends of said roll and shaped to conform with the ends of said roll, each said disc having a first, roughened surface for intermittently engaging the electrode at the end of said roll, and having a conductor extending generally axially away from a second surface thereof, each conductor having an offset spaced from said disc, and each said roughened surface comprising a plurality of sharp ridges of saw-tooth section extending parallel to a diameter of the disc;
    a housing for said capacitor comprising a tube with end closures;
    and means maintaining said discs in contact with the ends of said roll, including an insolating spacer between each disc and the adjacent end closure of the tube.

* * * * *